(No Model.) 8 Sheets—Sheet 2.

H. B. WHITEHEAD.
BRICK MACHINE.

No. 571,629. Patented Nov. 17, 1896.

WITNESSES:
Edward Thorpe
C. R. Ferguson

INVENTOR
H. B. Whitehead
BY
[signature]
ATTORNEYS.

(No Model.) 8 Sheets—Sheet 3.

H. B. WHITEHEAD.
BRICK MACHINE.

No. 571,629. Patented Nov. 17, 1896.

WITNESSES:
Edward Thorpe
C. R. Ferguson

INVENTOR
H. B. Whitehead.
BY
ATTORNEYS.

(No Model.)
H. B. WHITEHEAD.
BRICK MACHINE.
No. 571,629.
8 Sheets—Sheet 4.
Patented Nov. 17, 1896.
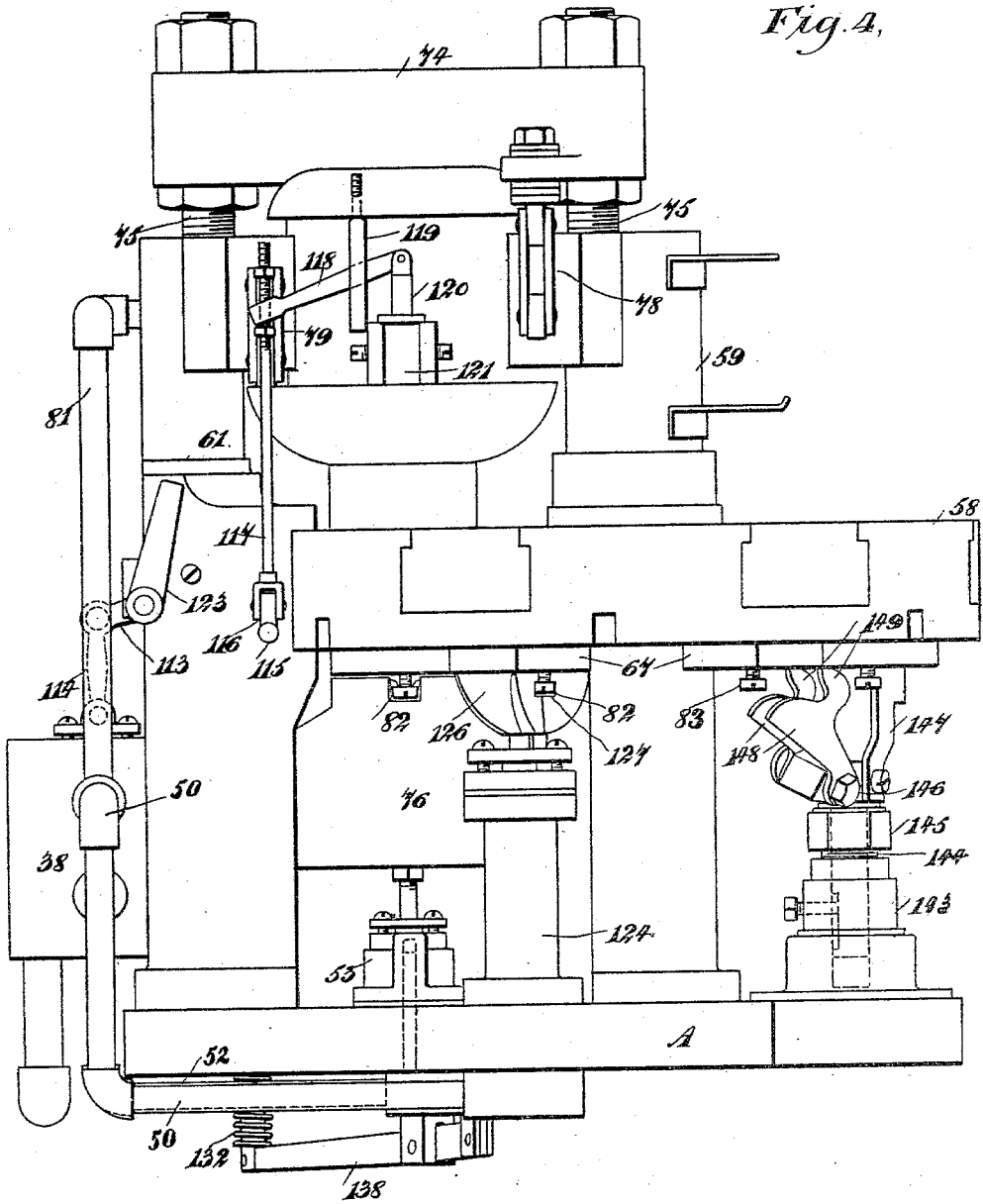
Fig. 4.
WITNESSES:
Edward Thorpe
C. R. Ferguson
INVENTOR
H. B. Whitehead
BY 
ATTORNEYS.

(No Model.)  8 Sheets—Sheet 6.
H. B. WHITEHEAD.
BRICK MACHINE.

No. 571,629.  Patented Nov. 17, 1896.

WITNESSES:
Edward Thorpe
C. R. Ferguson

INVENTOR
H. B. Whitehead.
BY
ATTORNEYS.

THE NORRIS PETERS CO., PHOTO-LITHO., WASHINGTON, D. C.

(No Model.) 8 Sheets—Sheet 7.
H. B. WHITEHEAD.
BRICK MACHINE.
No. 571,629. Patented Nov. 17, 1896.
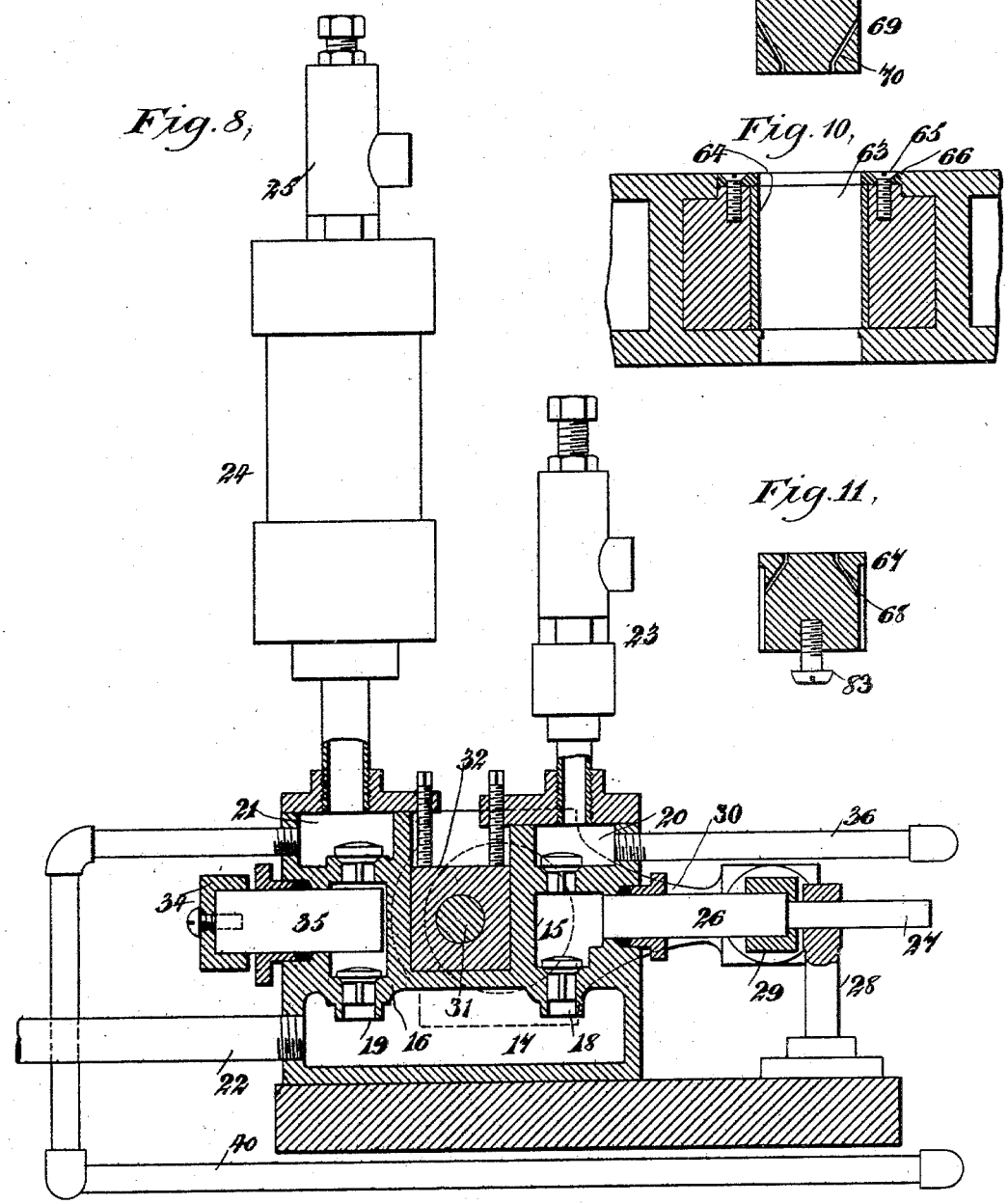
WITNESSES:
Edward Thorpe
C. R. Ferguson
INVENTOR
H. B. Whitehead.
BY
[signature]
ATTORNEYS.

(No Model.) 8 Sheets—Sheet 8.
H. B. WHITEHEAD.
BRICK MACHINE.
No. 571,629. Patented Nov. 17, 1896.
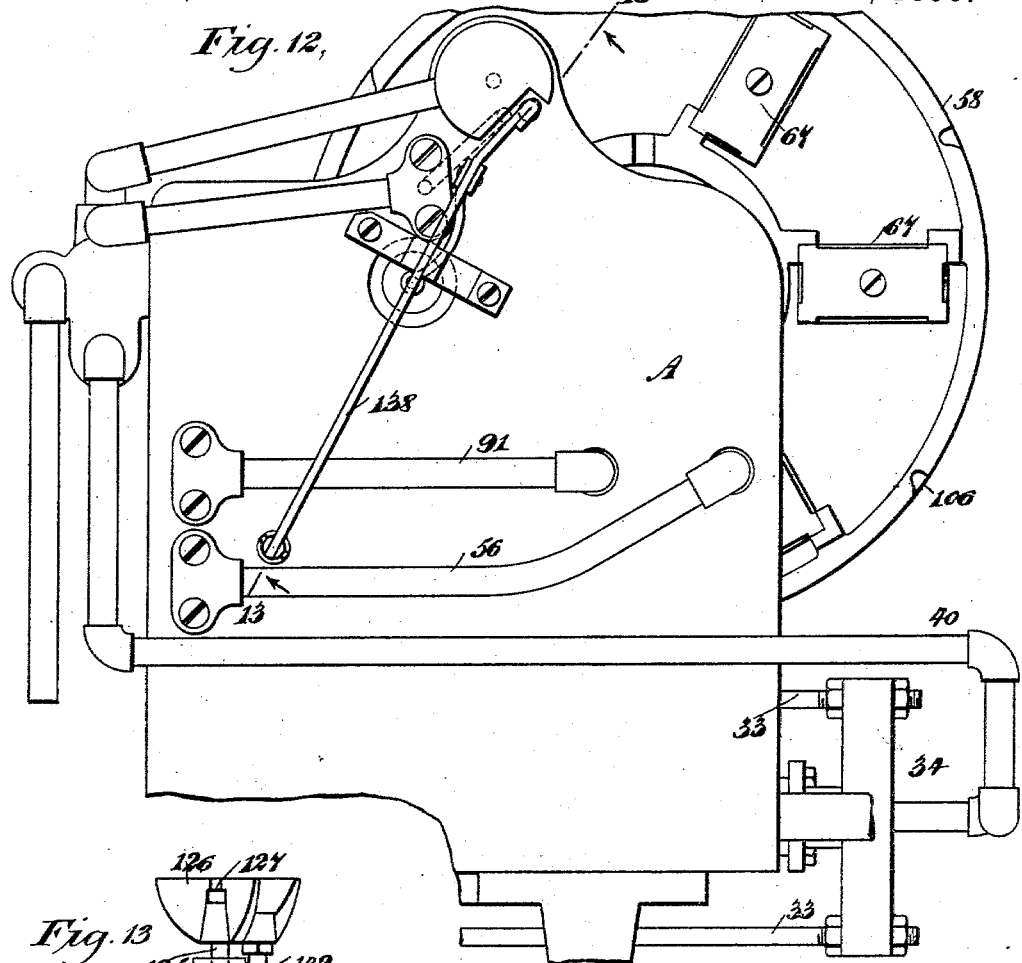
Fig. 12,
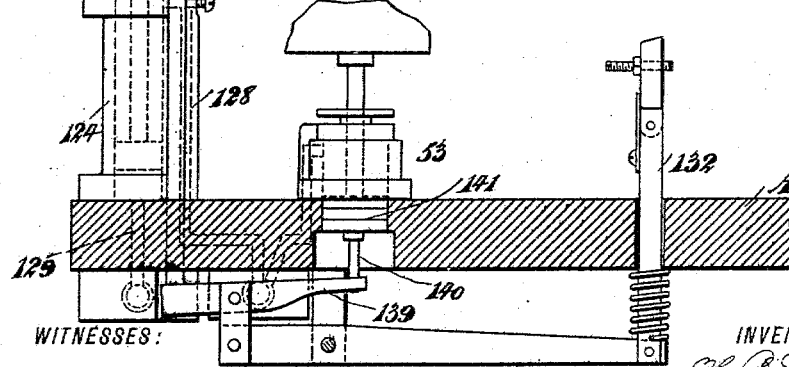
Fig. 13
WITNESSES:
Edward Thorpe
C. R. Ferguson
INVENTOR
H. B. Whitehead
BY
ATTORNEYS.

UNITED STATES PATENT OFFICE.

HENRY B. WHITEHEAD, OF MEMPHIS, TENNESSEE, ASSIGNOR OF ONE-HALF TO JOHN J. BISHOP, OF SAME PLACE.

BRICK-MACHINE.

SPECIFICATION forming part of Letters Patent No. 571,629, dated November 17, 1896.

Application filed February 12, 1896. Serial No. 578,968. (No model.)

*To all whom it may concern:*

Be it known that I, HENRY B. WHITEHEAD, of Memphis, in the county of Shelby and State of Tennessee, have invented a new and Improved Brick-Machine, of which the following is a full, clear, and exact description.

This invention relates to brick-machines employing a rotary table and operated by hydraulic pressure, and the main object is to simplify the working parts and operation in such a manner that the machine may be operated by an unskilled person.

I will describe a brick-machine embodying my invention, and then point out the novel features in the appended claims.

Reference is to be had to the accompanying drawings, forming a part of this specification, in which similar characters of reference indicate corresponding parts in all the views.

Figure 1:
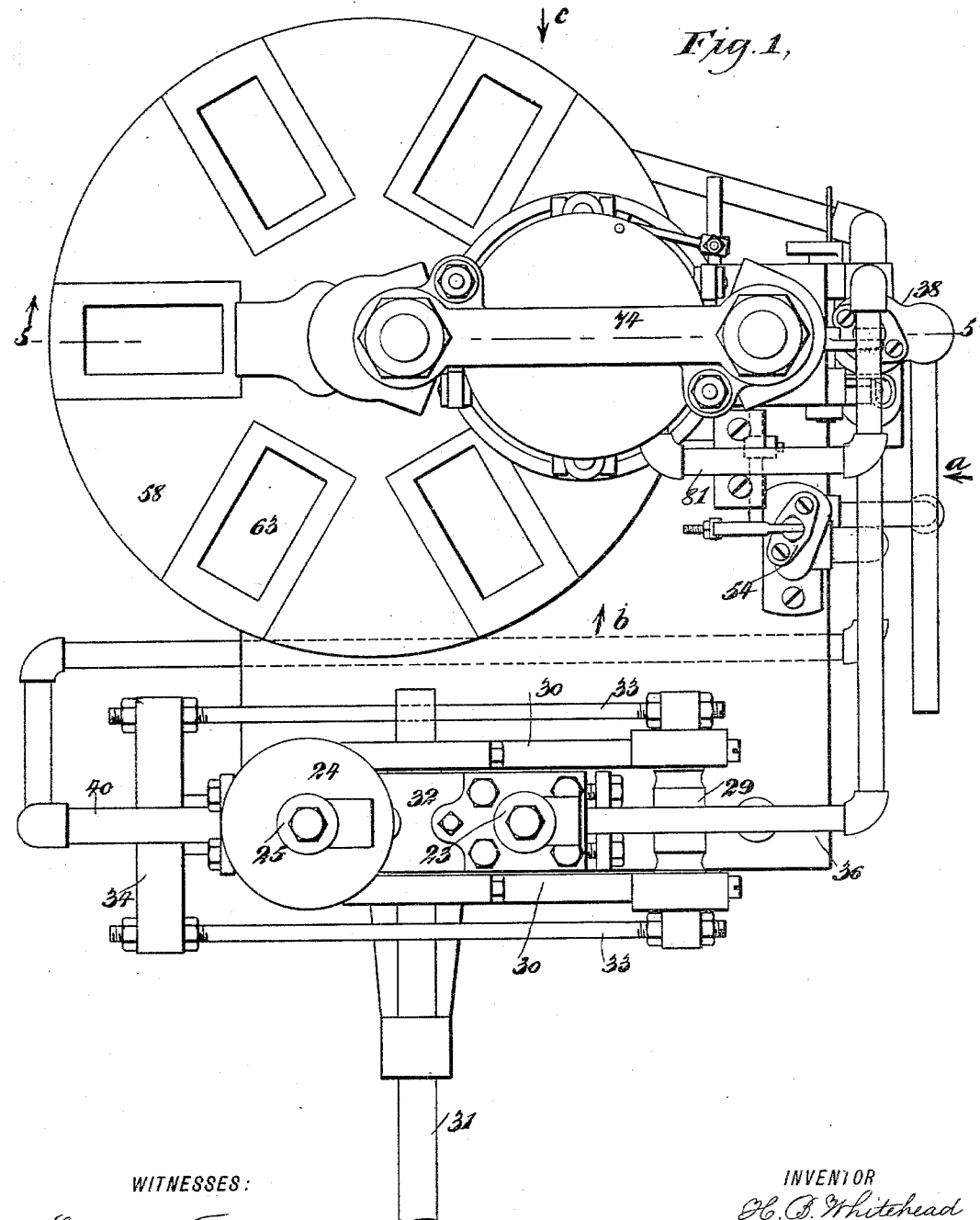
Figure 2:
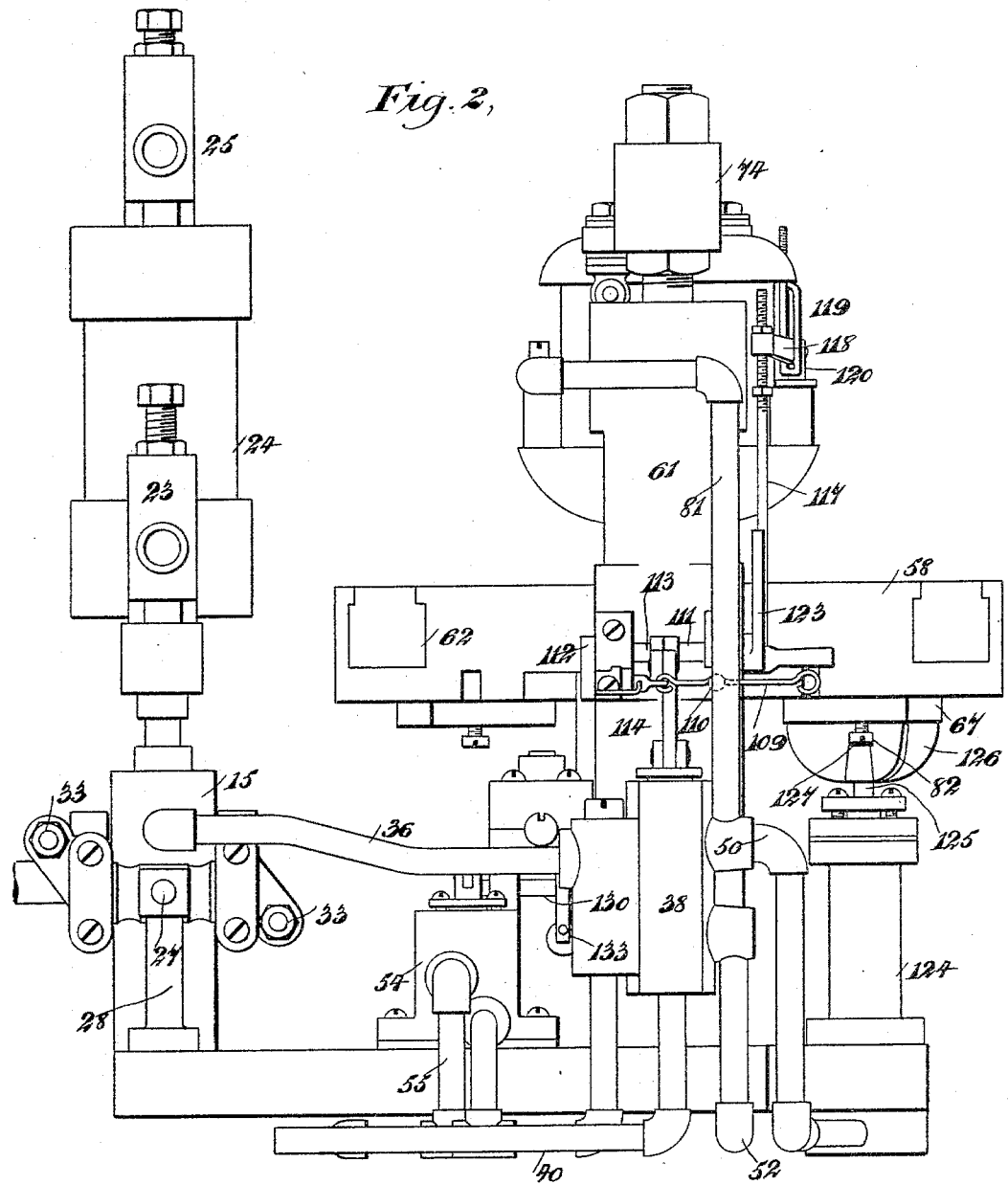
Figure 3:
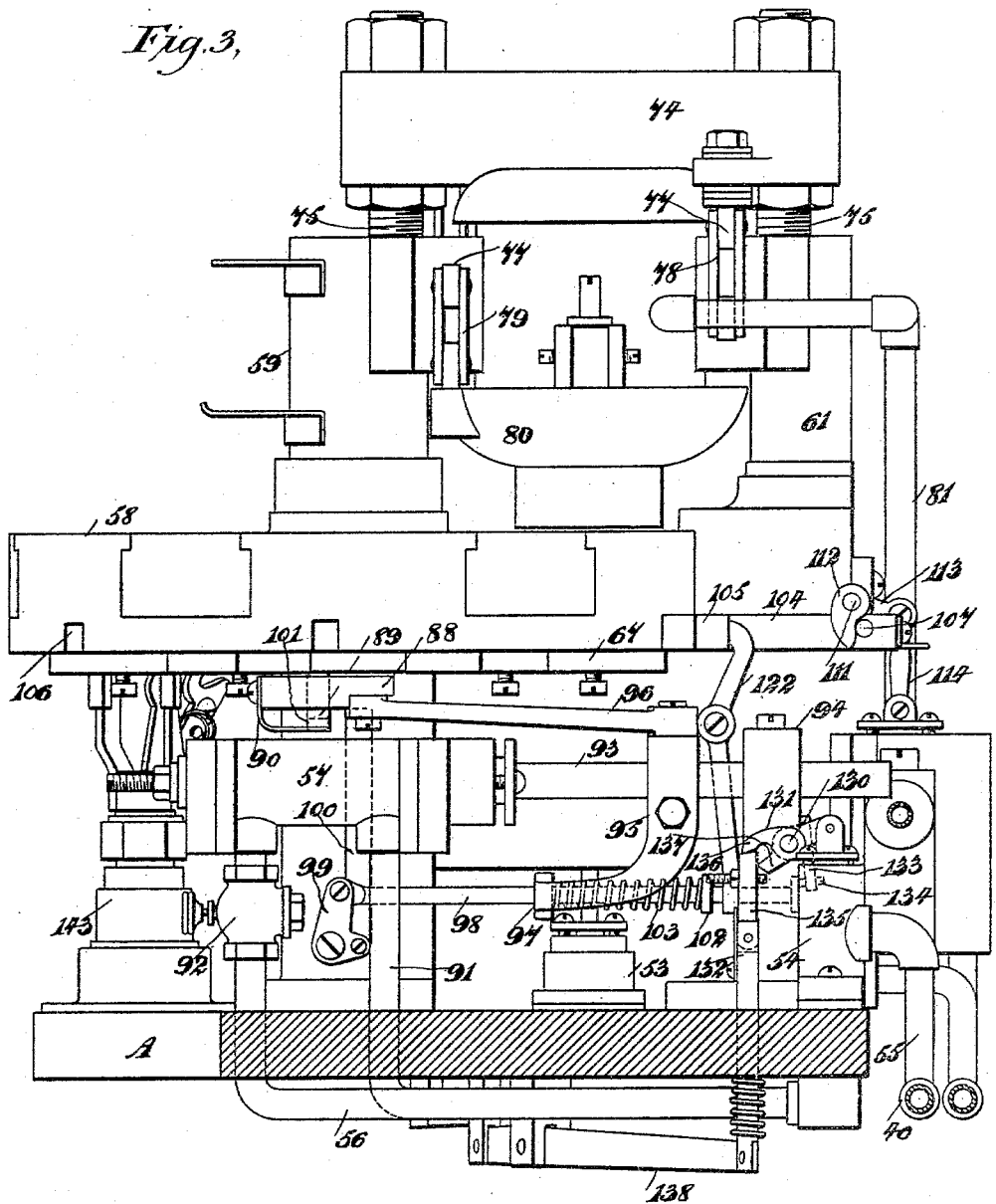
Figure 5:
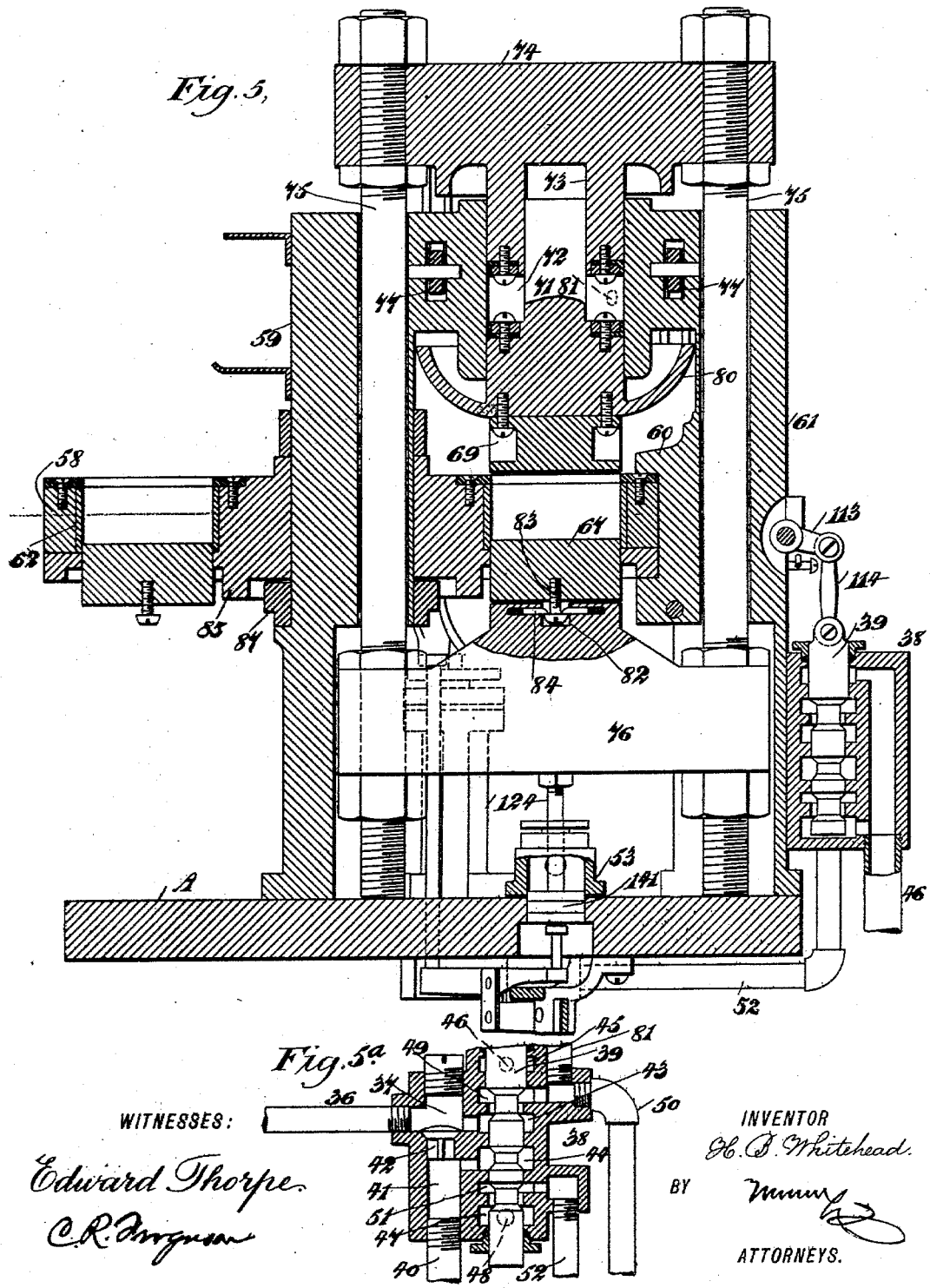
Figure 6:
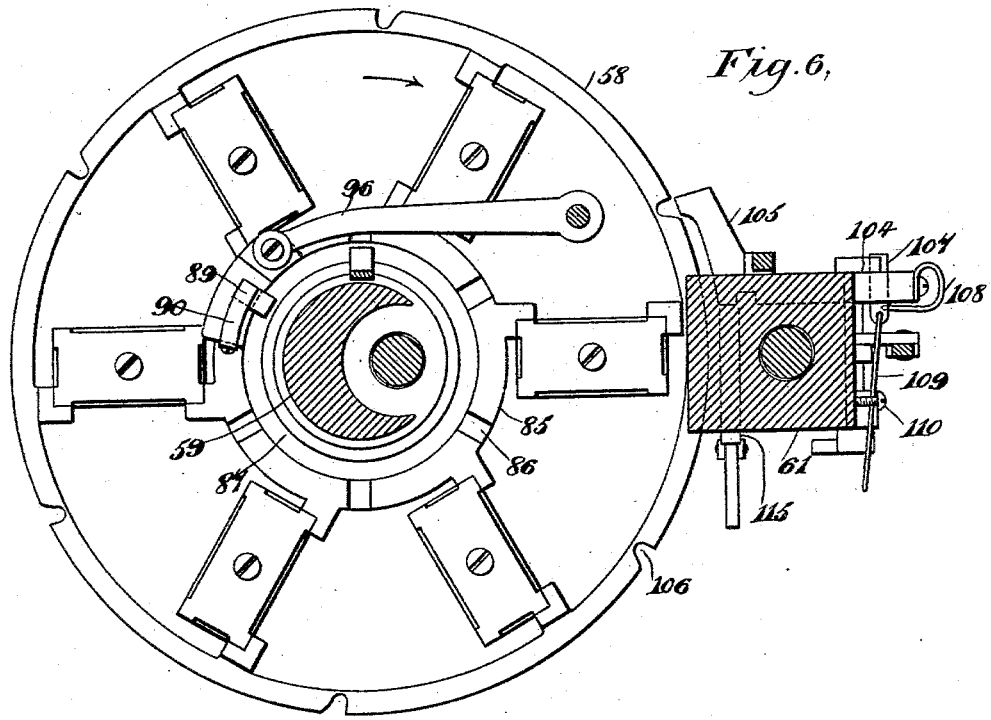
Figure 7:
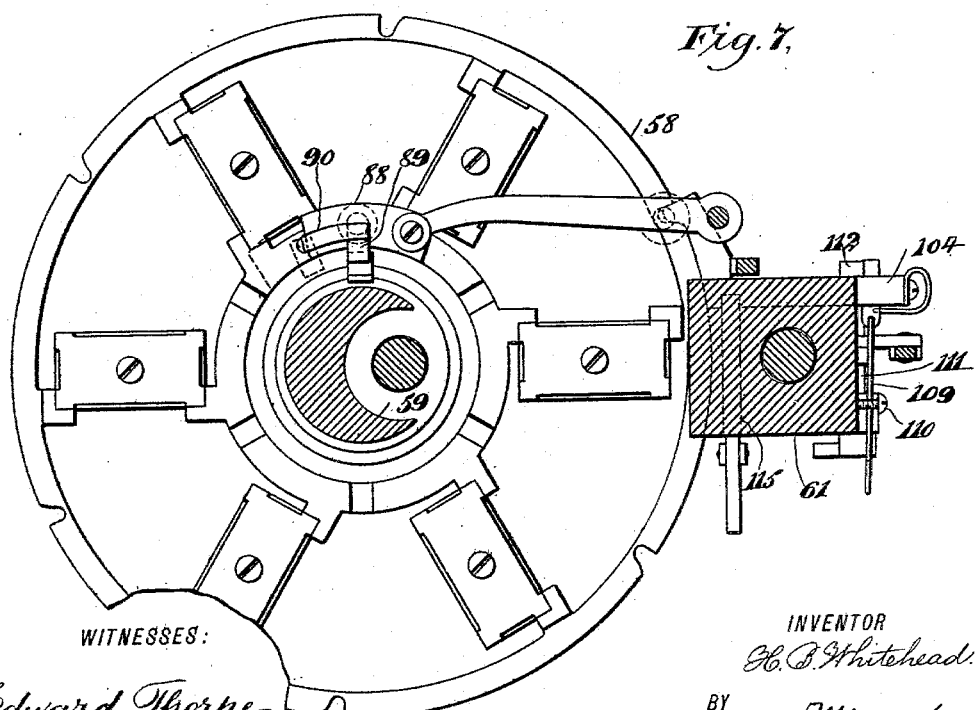

Figure 1 is a top plan view of a brick-machine embodying my invention. Fig. 2 is a side elevation looking in the direction of the arrow *a* in Fig. 1. Fig. 3 is a side elevation looking in the direction of the arrow *b* in Fig. 1 and with certain parts omitted. Fig. 4 is a side elevation looking in the direction of the arrow *c* in Fig. 1. Fig. 5 is a vertical section substantially on the line 5 5 in Fig. 1. Fig. 5ª is a sectional view of a slide-valve mechanism, taken at right angles to the sectional view of the same part in Fig. 5. Fig. 6 is a bottom plan view of the rotary table and showing mechanism for operating the same. Fig. 7 is a similar view and showing the operating mechanism in a different position. Fig. 8 is a longitudinal vertical section through the pump mechanism. Fig. 9 is a sectional view of the top mold-plunger. Fig. 10 is a sectional view of the mold. Fig. 11 is a sectional view of the bottom mold-plunger. Fig. 12 is a bottom plan view of the machine, and Fig. 13 is a section on the line 13 13 of Fig. 12.

The pressure-pump comprises a low-pressure cylinder 15 and a high-pressure cylinder 16, arranged in line one with the other and formed, preferably, in one casting. It also comprises a water-chamber 17, which communicates with the respective cylinders 15 16 through ducts 18 19, controlled by suitable puppet-valves, and these high and low pressure cylinders 15 16 communicate through valve-controlled openings with discharge-chambers 20 21. The receiving-chamber 17 is supplied with water through a pipe 22, and communicating with the discharge-chamber 20 of the high-pressure cylinder is a safety-valve 23 of any desired construction, and with the discharge-chamber 21 is connected an air-pressure cylinder 24, to the top of which is affixed a safety-valve 25. These safety-valves 23 25 are designed to regulate or limit the pressure from the pumps. The high-pressure pump is designed to operate the brick-pressing mechanism, and the low-pressure pump is designed to operate the rotary table and certain other parts of the machine, as will appear hereinafter.

A plunger 26 operates in the high-pressure cylinder 15, and this plunger has a stem portion 27 extended through a guide 28, extended upward from the bed-plate of the machine, and to the plunger or to its stem portion is secured a cross-head 29, which has eccentric connections 30 with eccentrics mounted on a driving-shaft 31, which has a bearing through a block 32, arranged in the casting between the high and low pressure cylinders, and from this cross-head 29 connecting-rods 33 extend to a cross-head 34, secured to the plunger 35 of the low-pressure cylinder. By this construction heavy framework to support the driving mechanism is obviated, and it will be seen that the plungers are alternately operated to impart power.

From the discharge-chamber 20 of the high-pressure cylinder a pipe 36 leads into a chamber 37, formed in the valve-casing 38 of the piston-valve 39, and from the discharge-chamber 21 of the low-pressure cylinder a pipe 40 leads into a chamber 41 in said valve-casing 38. Between the chambers 37 and 41 there is a port-opening controlled by an upwardly-opening valve 42, which will allow at a certain time the low pressure to pass up and mingle with the high pressure, but will prevent the high pressure from passing downward and mingling with the low pressure. In the valve-casing 38 above the chamber 43 is an exhaust-chamber 45, communicating with an exhaust-pipe 46, and below the chamber 44 is an exhaust-chamber 47, communicating with an exhaust-pipe 48. These several chambers 43, 44, 45, and 47 are separated by perforated diaphragms through which the slide-valve 39 operates.

In the valve-casing 38 between the chambers 43 and 45 is a chamber 49 which has a pipe 50 leading to and designed to convey pressure to operate the pressing devices and also to impart an upward motion to an extractor, as will be hereinafter described, and from a chamber 51, arranged between the chambers 44 47, a pipe 52 supplies or conveys pressure to impart a downward motion to the extractor and also communicates with a cylinder 53 above a piston therein which has connection with a vertically-operating cross-head to which the upwardly-pressing die is attached. The piston-valve 39 above the chamber 49 is larger in diameter than the parts below, so that when in position to supply pressure to the pressing cylinder and extractor the constant effort of the hydraulic pressure is to force the valve 39 upward.

A piston-valve mechanism 54 is also mounted on the bed A of the machine, and the casing of this valve has a pipe connection 55 with the pipe 40, leading from the low-pressure pump. The valve within the casing 54 is designed to control the flow of water through pipes 56 and 91 to operate on both sides of a piston arranged within a horizontal cylinder 57, the said piston being designed to operate a table 58.

The table 58 is mounted to rotate in a horizontal plane on a post 59, extended upward from the bed-plate A, and this table rotates through a support 60 on a post 61, extended upward from said bed-plate A. The table 58 is provided with a number of outwardly-opening radial recesses 62, within which the brick-molds 63 are secured by means of bolts or set-screws passing in from the periphery of the table and engaging recesses formed in the sides of the mold. These molds 63 are preferably provided with a hard-steel lining 64, and they are held in position by means of screws 65, passing through a framework 66 and into the body of the mold, as plainly indicated in Fig. 10.

67 indicates the bottom or lower die, adapted to be seated in the mold 63. It consists of a metal block conformed to and engaging closely with the walls of the mold. It is provided with air-ducts 68 for the discharge of air from the mold and brick during the process of pressing. 69 is the upper die, which is also provided with air-outlet ports 70. The upper die 69 is connected to a plunger 71, movable vertically in a chamber 72, formed in a cross-piece extended between the tops of the posts 59 and 61. This plunger 71 has a reduced stem portion, and surrounding this stem portion is a cylindrical plunger 73, movable in the chamber 72 and attached to a cross-head 74, secured to the upper ends of rods 75, movable through vertical openings in the posts 59 61, and the lower ends of these rods 75 are connected by a cross-head 76, designed to move the lower die upward at a certain time or when the upper die is moving downward.

Extended transversely through openings in the cross-piece containing the chamber 72 and pivoted therein are levers 77. These levers 77 have link connections 78 with the cross-head 74 and at the opposite end have link connections 79 with an upwardly-turned or cup-shaped flange 80, secured to the lower portion of the plunger 71. These links serve to equalize the movement of the plungers 71 and 73 and to lift the upper die 69 out of the mold when the brick is pressed.

Pressure is applied to the plungers 71 73 to move them in opposite directions, by water forced through a pipe 81, leading from the high-pressure chamber 49 of the valve-casing 38 into the chamber 72. The upper surface of the cross-head 76 is provided with a transverse slot 82, in which a headed bolt 83, attached to the lower die 67, is adapted to pass when said cross-head is moved upward relatively to the lower die. It is designed when the cross-head 76 moves downward to also move the lower die slightly downward, and as a means therefor I provide clutches for engaging with the headed bolt 83. These clutches, as shown, comprise pins 84, movable in horizontal recesses formed in the cross-head and having their adjacent ends projected slightly into the slot 82. These pins 84 are projected outward by suitable springs, as indicated in the drawings, and their upper surfaces are beveled downward, so that they will be moved inward by the contact of the head of the bolt 83, and when the bolt-head shall have passed below the plane of the clutch-pins said pins will be forced over the top thereof by their springs.

I will now describe the mechanism for imparting a step-by-step motion to the table 58. The under side of the table 58 is provided with a downwardly-extending annular flange 85, which surrounds the post 59 and is provided with a series of notches 86 equal in number to the number of molds carried by the table. Within the circumference of the flange 85 and adapted to have a rotary movement on the post 59 is a ring 87, which has a lateral extension 88 at one side, provided with a vertical opening through which a dog or block 89 is adapted to move to engage in the notches 86. This block 89 is impelled upward by means of a spring-plate 90, secured at one end to the projection 88, bearing at its free end against the lower side of the block 89.

The cylinder 57, arranged beneath the rotary table 58, receives its power from the low-pressure pump and through the valve-casing 54 through the pipe 56, leading into the cylinder at one side of the piston, and through the pipe 91, leading into the cylinder at the opposite side of the piston, and the pipe 56 may be provided with a suitable regulating-valve 92. The stem 93, extended from the piston operating in the cylinder 57, extends through a suitable guide 94, extended upward from the bed-plate A of the machine, and to this stem 93 is secured an angle-lever 95. To the upper end of this angle-lever 95 one end of a pitman 96 is pivoted, and the other end of said pitman 96 is pivoted to the lateral extension 88 on the ring 87, and obviously during the back-and-forth movement of the piston-stem 93 the pitman 96 will be correspondingly moved and will impart a back-and-forth movement to the ring 87 in the arc of a circle, the forward movement of said ring being sufficient to rotate the table 58 to bring the dies successively under the upper presser-block.

The lower arm of the angle-lever 95 has a ring or sliding connection 97 with a rod 98, movable horizontally in a suitable guide and connected pivotally at one end to a bell-crank lever 99, pivoted to the post 59. The shorter end of this bell-crank lever 99 has pivotal connection with a rod 100, extended vertically through a suitable guide formed in the post 59 and having a hook-shaped upper end adapted to engage the upper side of a hook portion 101, extended laterally from the lower end of the block or dog 89.

Arranged between the collar 97 of the angle-lever 95 and a collar 102 on the rod 98 is a coil-spring 103. By this construction it will be seen that when the piston rod or stem 93 is moved outward the pitman 96 will move the ring 87, and as the dog or block 89 is engaged within one of the notches 86 of the table the said table will consequently be rotated one step, and at nearly the end of this movement the hook portion 101 of the block or dog 89 will engage with the hooked end of the rod 100, so that at the latter portion of the outward movement of the piston rod or stem 93 the collar 97 on the angle-lever 95, engaging with the end of the spring 103, will force the rod 98 longitudinally to rock the bell-crank lever 99, which will draw the bar 100 downward to withdraw the block or dog 89 out of the notches 86, and then upon the return movement of the piston-rod 93 the table 58 will remain stationary and the upper end of the dog or block 89 will ride upon the under surface of the flange 85 until it shall have reached the next notch 86, into which it will be forced by the springs 90.

I will now describe locking means for holding the table rigidly in position during the pressing of the brick. As here shown, this locking means consists of a bolt 104, movable horizontally in a guide formed in one side of the post 61. From the inner end of this bolt 104 an arm 105 extends laterally, and this arm 105 is provided with a finger adapted to engage in notches 106, formed in the periphery of the table 58. Movable transversely through the outer end of the bolt 104 is a stop-lug 107, which is impelled forward through said bolt 104 by means of a spring 108, secured at one end to the end of the bolt 104 and at the opposite end engaging with the lug 107. From the inner end of this lug 107 a hand-rod 109 extends across the outer side of the post 61, and this hand-rod 109 is provided with a notch or depression adapted to engage a lug 110, extended from the post 61.

A rock-shaft 111 is supported by the post 61, and at the outer side thereof one end of this rock-shaft is provided with a toe 112, adapted to engage with the movable lug 107 when the same is in its outer position, and this rock-shaft 111 is also provided with an arm 113, which has pivotal connection with the stem of the valve 39 through the medium of a link 114.

115 is a bolt movable transversely through an opening in the post 61 and is adapted to be automatically operated for locking and releasing the bolt 104. In its locking position the bolt 115 will engage in a notch formed in the inner side of the bolt 104. At its opposite end the bolt 115 has a sliding connection with a bell-crank lever 116, fulcrumed to the post 61. The longer arm of this bell-crank lever 116 forms a hand-lever, and this hand-lever portion is pivotally connected to the lower end of a rod 117. The upper threaded end of this rod 117 passes loosely through an opening in a lever 118, and as a means to adjust the movement of the rod 117 vertically I provide it with nuts on its screw portion above and below the lever 118. The lever 118 passes loosely through a slotted hanger 119, depending from the upper cross-head 74, and the end of this lever 118 is pivotally connected to one of the guide-posts 120, extended from the cup-shaped flange 80 through guideways 121, secured to the outer side of the cylinder 72. By this construction when the cross-head moves upward and shall have reached nearly to the limit of its upward movement the lower end of the hanger 119 will engage with the lever 118, and this lever 118 will draw upward on the rod 117, and this movement of the rod 117 will draw the bolt 115 out of engagement with the bolt 104, thus allowing said bolt 104 to be moved out of engagement with the rotary table, when the unbalanced pressure acting against the enlarged part of the piston-valve 39 will cause it to instantly make its upstroke, withdrawing bolt 104 from the table.

As a means to force the bolt 104 to its locking position with the table 58 I employ a lever 122, fulcrumed on the post 61 and having its upper end engaged with the outer surface of the projection 105 on the said bolt and having its lower end engaged loosely over the rod 98 rearward of the collar 102 on said rod. It will be seen, therefore, that when the piston-rod 93 is moved outward to rotate the table and when it shall have reached the limit of its motion with the table in the proper position the spring 103 will rock the lever 122 on its pivot, and consequently force the bolt 104 into its locking position, the said bolt being moved outward, as before described.

I will now describe a means for ejecting a pressed brick from the mold. This means comprises a cylinder 124, within which operates a piston; and it may be here remarked that said piston is operated in its upward motion by pressure from the high-pressure cylinder and is operated on its downstroke from the low-pressure cylinder. A piston-rod 125 extends from the piston within the cylinder 124 and is provided with a head 126, consisting of cross-arms, and at the central or meeting portions of these cross-arms a substantially T-shaped opening 127 is provided, into which the head of the bolt 83 on the lower die 67 is intended to pass, so that the upper surface of the head of said bolt will engage with the shoulders of the slot 127. Pressure is admitted to the upper side of the piston within the cylinder 124 through the port 128, and pressure is admitted to the lower side of said piston through the port 129.

I will now describe a means for automatically operating a piston-valve within the casing 54.

130 is a rock-shaft upon one end of which is secured an arm 131, one end of said arm being pivotally connected to the stem of the slide-valve within the cylinder 54 and the other end being projected forward to be engaged with the vertically-movable bar 132. The rock-shaft 130 has a downwardly-extended arm 133, which is extended into the line of movement of the rod 98, so that when said rod 98 is moved outward its end will engage with the arm 133 and rock the rock-shaft 130 to move the piston-valve within the cylinder 54 upward. The movement of the piston-valve may be regulated by means of a screw 134 at the lower end of the arm 133 and engaged with the end of the rod 98. The bar 132 has pivoted to its upper end a vertical extension 135, and this extension 135 is held yieldingly in position by means of a spring bearing thereon and fastened at one end to the bar 132. The upper end of this extension 135 is adapted to engage with the lower side of a finger 136 on the arm 131, and below this finger 136 is a finger 137, which is adapted to deflect the extension 135 beyond the end of the finger 136 after the bar shall have moved upward sufficiently to rock the arm 131 to move the slide-valve within the cylinder 54 downward, and when this part 135 is deflected beyond the end of the finger 136, the said arm 131 will be released for its subsequent operation to move the slide-valve upward.

The lower end of the bar 132 is connected to a lever 138, fulcrumed to a hanger extended downward from the lower side of the bed-plate A, and to an upward projection at the rear end of this lever 138 is pivoted a rock-lever 139, one end of which has an upward projection 140, adapted to be engaged by the piston 141 within the cylinder 53 on the downward movement of said piston. It will be noticed that the cylinder 53 opens through the bed-plate A. The opposite end of said lever 139 is engaged by a rod 142, extended downward from the cross-head 126 on the piston-rod of the extractor-cylinder. Therefore it will be seen that the lever 139 will be rocked by the downward stroke of the piston 141 and also on the downward stroke of the piston within the ejector-cylinder, and together they will rock the lever 138 to move the bar 132 upward.

I will now describe a means for regulating the depth of the mold or the amount of clay to be placed therein. Mounted on the bed-plate A forward of the ejector-cylinder 124 is a standard 143, from which a post 144 extends upward. The upper end of this post 144 is screw-threaded, and said screw-thread is engaged by a nut 145, the upper side of which is engaged with a vertically-adjustable block 146. From this block 146 arms 147 extend upward and then horizontally beneath the table 58. The horizontal portions of these arms are curved in the directions of the circumference of the table and are designed to raise the lower presser-die to its proper position in the mold to be charged with clay from a hopper arranged over the same.

The lower side of the lower die after leaving its connection with the ejector will be on a plane below the upper side of the horizontal portions or tracks of the arms 147, and as a means to raise the same to a higher plane coincident with that of the top of the arms I employ fingers 148, which are pivoted at their lower ends to a shaft mounted in a bearing on the head 146, arranged at an incline, so that said fingers may swing, substantially, in a circular line. As the table moves, the lower side of the die will engage upon the upper ends of the fingers 148 and the forward side of the die will engage against the upwardly-projecting lugs 149 on said fingers, and by the continued movement of the table the die will cause the fingers 148 to rock on their pivot, and this movement will elevate the die to the plane of the horizontal portions of the arms 147.

In operation, the shaft of the pumps being revolved and pressure raised to start the press, the operator releases the rod 109. He then throws the hand-lever 123 outward to depress the piston-valve 39 in the cylinder, and then the spring-bolt 107 moves out in front of the arm 112, thus locking the valve down. This throws the high pressure into the cylinder 72, forcing the dies into the mold against the clay to form the brick, and at the same time throws the high pressure into the bottom end of the extractor-cylinder to force a finished brick out of the mold and hold it up while the dies are pressing another brick.

The die compresses the clay in the mold until the pressure rises high enough for the extractor to start the finished brick out of its mold. The brick being once started moves very easily. This will cause the pressure in the cylinder 72 to drop, releasing the pressure on the dies for an instant and allowing the air to escape from the mold through the ports formed in the dies. The dies then close the brick down to size. The lever 118, the rod 117, the bell-crank lever 116, and the bolt 115 will then have moved so as to release the bolt 104, when the piston-valve 39 instantly makes its upstroke, withdrawing the bolt 104 from the table, exhausts high pressure from the pressing-cylinder 72, the extractor-cylinder 124 mingles the two pump-pressures, throws the low pressure to cylinder 53 to separate the dies and the extractor for the downstroke, which rocks the lever 138, lifts the bar 132, and forces the piston-valve 54 down, throwing the low pressure to the cylinder 57 to revolve the table one step forward, locks the table, and depresses and locks the piston-valve 39, when the cycle of movements will be repeated until stopped by hooking the hand-rod 109 on the stud 110. As the cross-head 76 moves downward it will draw the lower die 67 slightly downward by means of the fingers 84 engaging with the bolt 83, and then the continued rotary movement of the table will carry the mold into engagement with the ejector. This ejector will force the bottom dies, and consequently the brick, upward out of the mold, and then on a downward movement of the piston in the ejector-cylinder the lower die will be drawn downward out of engagement with the brick, and then this lower die will be moved into its normal or desired position within the mold by means of the regulator having the arms 147, and these arms may be adjusted vertically by manipulating the nut 145.

Having thus described my invention, I claim as new and desire to secure by Letters Patent—

1. A brick-machine, comprising a mold, dies operating therein and having air-outlets, a cylinder receiving pressure by which said dies are operated, an extractor-cylinder, and means for forcing a high pressure only into both the pressure-cylinder and extractor-cylinder, and causing an intermittent action of the dies and thus allowing air to escape, substantially as specified.

2. In a brick-forming machine operated by hydraulic pressure, a pressure-controller, comprising a valve-casing having a series of receiving and exhaust chambers one above another formed by perforated partitions in the casing, a piston-valve movable through said perforations, having one end enlarged so as to be self-moving by hydraulic pressure in one direction to instantly release the pressing devices and reverse their movement, high and low pressure chambers in said casing and communicating with certain of said first-named chambers, and a valve-controlled opening between the said two chambers the valve controlling said opening being independent of the piston-valve, substantially as set forth.

3. A brick-machine-operating pump, comprising high and low pressure cylinders formed in a single casting, a receiving-chamber in said casting below the cylinders, puppet-valve-controlled openings between the receiving-chambers and the cylinders, discharge-chambers above the cylinders, puppet-valve-controlled openings between said cylinders and the discharge-chambers, plungers operating in said cylinders, and rods connecting the cross-heads of said plungers, whereby they may move in unison in opposite directions, substantially as specified.

4. A pump for operating a brick-machine, comprising high and low pressure cylinders formed in a single casting, air-chambers or safety-valves communicating with the cylinders, a receiving-chamber in said casting having valve-controlled communication with the cylinders, plungers operating in said cylinders, a cross-head on each of the plungers, connecting-rods between each of the plungers, a driving-shaft having a bearing in a block arranged between the two cylinders, eccentrics on said driving-shaft, and eccentric-rods extended from said eccentrics to a connection with the cross-head of one of the plungers, substantially as specified.

5. In a brick-machine operated by hydraulic pressure, a controlling-valve into which pressure is discharged and comprising a valve-casing having high and low pressure chambers and having a valve-controlled communication whereby the low pressure may mingle with the high pressure, a piston-valve movable in chambers having communication with the first-named chambers, a pressure-cylinder having oppositely-moving plungers therein for operating upper and lower dies, a connection between said cylinder and the piston-valve casing, a cylinder having communication with a valve-casing, a piston operated in said cylinder, a rotary table carrying molds, connections between said table and the piston in the last-named cylinder for rotating said table, and a table-locking device operated from said piston, substantially as specified.

6. A brick-machine, comprising a rotary table carrying molds, a post upon which said table is mounted, a notched flange on the lower side of said table, a ring mounted on the post within the circumference of the flange, a dog carried by said ring and adapted to engage in the notches of the flange, a cylinder arranged below the table, a piston operating therein by hydraulic pressure, a connection between said piston and the ring, whereby a step-by-step rotary motion may be imparted to the table a bell-crank lever operated by the piston, and a rod extended from the bell-crank lever and adapted to engage the dog to release it from the table, substantially as specified.

7. A brick-machine, comprising a rotary table carrying molds, lower dies for the molds, a cross-head operated by hydraulic pressure for moving said lower die upward, and a clamping device between said lower die and the cross-head consisting of a headed lug on the die and spring-yielding bolts on the cross-head, whereby said die may be moved downward on the downward movement of the cross-head, substantially as specified.

8. A brick-machine, comprising a die-supporting cross-head, a rotary table, a piston operated by hydraulic pressure, for rotating said table, a locking device for said table, comprising a longitudinally-movable bolt, means whereby said bolt may be moved into locking position by a movement of the table-operating piston, a transversely-movable bolt for locking the first-named bolt, and a connection between the transversely-movable bolt and the die-supporting cross-head, whereby the said bolt may be moved out of engagement with the first-named bolt, substantially as specified.

9. A brick-machine, comprising a rotary table carrying molds, dies movable in said molds, a low-pressure pump for operating the table, a high-pressure pump for operating the dies, and an ejector comprising a cylinder having a piston therein operated in its upward movement from the high-pressure pump and in its downward movement from the low-pressure pump, substantially as specified.

10. In a brick-machine, a rotary table carrying molds, upper and lower dies movable in said molds by hydraulic pressure, an ejector operated by hydraulic pressure, and comprising a head having means for engaging with a projection on the lower die, whereby said lower die may be moved downward in the mold, and means forward of the ejector for moving said lower die upward in its mold, to regulate the amount of clay to be placed therein, substantially as specified.

11. A brick-machine, comprising a rotary table carrying molds, lower dies carried in the molds and movable therein, and a regulator therefor comprising horizontally-extended arms or tracks, and swinging arms for raising the lower die to the plane of the horizontally-disposed arms the said swinging arms being operated by the engagement of the die therewith, substantially as specified.

HENRY B. WHITEHEAD.

Witnesses:
AUGUSTUS SADLER,
W. J. BELCHER.